US007962848B2

(12) United States Patent
Bertram (10) Patent No.: US 7,962,848 B2
(45) Date of Patent: Jun. 14, 2011

(54) METHOD AND SYSTEM FOR REDUCING THE HORIZONTAL SPACE REQUIRED FOR DISPLAYING A COLUMN CONTAINING TEXT DATA (75) Inventor: Randal Lee Bertram, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 11/549,706

(22) Filed: Oct. 16, 2006

(65) Prior Publication Data
US 2007/0130507 A1 Jun. 7, 2007

Related U.S. Application Data (62) Division of application No. 09/089,098, filed on Jun. 2, 1998, now Pat. No. 7,168,039.

(51) Int. Cl.
G06F 17/21 (2006.01)
(52) U.S. Cl. .................. 715/254; 715/227; 715/261
(58) Field of Classification Search .................. 715/227, 715/261
See application file for complete search history.

(56) References Cited

U.S. PATENT DOCUMENTS

| | | | |
|---|---|---|---|
| 4,457,638 A | 7/1984 | Horn et al. | |
| 4,459,049 A | 7/1984 | Howell et al. | |
| 4,484,826 A | 11/1984 | Horn et al. | |
| 4,486,857 A | 12/1984 | Heckel | |
| 4,575,813 A | 3/1986 | Bartlett et al. | |
| 4,608,664 A | 8/1986 | Bartlett et al. | |
| 4,760,528 A | 7/1988 | Levin | |
| 5,264,926 A | 11/1993 | Rylander | |
| 5,410,475 A * | 4/1995 | Lu et al. | 704/1 |
| 5,458,376 A | 10/1995 | Biewald | |
| 5,566,330 A | 10/1996 | Sheffield | |
| 5,583,660 A | 12/1996 | Rylander | |
| 5,634,084 A * | 5/1997 | Malsheen et al. | 704/260 |
| 5,691,708 A * | 11/1997 | Batchelder et al. | 340/7.29 |
| 5,937,417 A | 8/1999 | Nielson | |
| 5,956,433 A | 9/1999 | Sasaki | |
| 6,073,129 A | 6/2000 | Levine et al. | |
| 6,279,018 B1 * | 8/2001 | Kudrolli et al. | 715/234 |
| 6,289,304 B1 * | 9/2001 | Grefenstette | 704/9 |
| 6,345,283 B1 | 2/2002 | Anderson | |
| 6,356,920 B1 | 3/2002 | Vandersluis | |
| 6,854,642 B2 | 2/2005 | Metcalf et al. | |
| 7,549,114 B2 * | 6/2009 | Bederson et al. | 715/200 |
| 2001/0013032 A1 | 8/2001 | Kobayashi et al. | |
| 2005/0193337 A1 | 9/2005 | Noguchi et al. | |

OTHER PUBLICATIONS

IBM Technical Disclosure Bulletin, vol. 35, No. 6, Nov. 1992, Instant Column Customization, pp. 224-225.

(Continued)

Primary Examiner — Stephen S Hong
Assistant Examiner — I-Chan Yang
(74) Attorney, Agent, or Firm — Joscelyn G. Cockburn (57) ABSTRACT A method and system for reducing an amount of horizontal space required when displaying a plurality of columns on a display screen is disclosed. The at least one column of the plurality of columns has at least one entry containing text data. The method and system include obtaining the at least one entry from the at least one column, and abbreviating a width of the at least one entry, determining if there is another entry containing text data. The method and system further include repeating the steps of obtaining the at least one entry, abbreviating the at least one entry and determining if there is another entry until all of the at least one entries are abbreviated. The method and system further include displaying the at least one column having the at least one abbreviated entry.

8 Claims, 6 Drawing Sheets

OTHER PUBLICATIONS

IBM Technical Disclosure Bulletin, Abbreviated Typing for Word Processing, Feb. 1979, p. 3796-3797.

Mostert et al., Omni-font character recognition using templates and neural networks, IEE, Sep. 1992, pp. 249-257.

* cited by examiner

| SYSTEM | BYTES RECEIVED | BYTES SENT | CPU UTILIZATION | DISK 1 WORKLOAD |
|---|---|---|---|---|
| 10 | 3 | 3 | 5 | 5 |
| 22 | 5 | 5 | 3 | 3 |
| 24 | 7 | 4 | 7 | 5 |
| 26 | 8 | 3 | 8 | 6 |
| 28 | 5 | 6 | 9 | 5 |

FIG. 4 (PRIOR ART)

| SYSTE | BYTES | BYTES | CPU U | DISK | DISK |
|---|---|---|---|---|---|
| 10 | 3 | 3 | 5 | 5 | 5 |
| 22 | 5 | 5 | 3 | 3 | 5 |
| 24 | 7 | 4 | 7 | 5 | 6 |
| 26 | 8 | 3 | 8 | 6 | 5 |
| 28 | 5 | 6 | 9 | 5 | 4 |

FIG. 8

| SYSTEM | BytsR | BytsS | CPU Ut | Dsk1W | Dsk2W |
|---|---|---|---|---|---|
| 10 | 3 | 3 | 5 | 5 | 5 |
| 22 | 5 | 5 | 3 | 3 | 5 |
| 24 | 7 | 4 | 7 | 5 | 6 |
| 26 | 8 | 3 | 8 | 6 | 5 |
| 28 | 5 | 6 | 9 | 5 | 4 |

METHOD AND SYSTEM FOR REDUCING THE HORIZONTAL SPACE REQUIRED FOR DISPLAYING A COLUMN CONTAINING TEXT DATA

This is a Divisional application which claims priority of patent application Ser. No. 09/089,098, filed Jun. 2, 1998 now U.S. Pat. No. 7,168,039.

FIELD OF THE INVENTION

The present invention relates to graphically displaying data and more particularly to a method and system for reducing the horizontal space used to display a column containing text data.

BACKGROUND OF THE INVENTION

To allow a user to easily understand data relating to a variety of objects, data is often displayed in a table organized into rows and columns. Columns in the table may have entries containing text data. Columns with entries containing text data may take up more horizontal space than is desirable. For example, each column typically includes a column heading describing the data in the column. Thus, the column heading typically contains text data. In many cases, the column heading is significantly longer than the data in the other column entries. This can cause several problems such as wasting space on the display or forcing a user to scroll horizontally to view data for some of the columns.

One context in which column entries containing text data require a great deal of horizontal space is in capacity management. Capacity management is of increasing interest for a network containing a plurality of systems. Capacity management refers to the monitoring of and upkeep of the network. The network may contain servers, computer systems for individual users of the network, mainframes, printers, or other systems. Depending on the size of the network, the network could be made up of only a few systems or thousands of systems. A network administrator is typically responsible for ensuring that individual portions of the network function and that the network as a whole functions.

In order to ensure that the network functions, the network administrator keeps track of monitors for each system. A monitor is an attribute of a particular system. For example, monitors include central processing unit ("CPU") utilization, disk space available, disk work load, the number of bytes sent by the system, and the number of bytes received by the system.

Applications allow a user such as a system administrator to query the systems within the network and receive information relating to each system's monitors. Once the data relating to the monitors are received, a network administrator typically displays the data on a display for the network administrator's system. One way of displaying this data is in the form of a table. Typically, a column of the table includes entries for a monitor and a row of the table has data relating to monitors for one system within the network. Typically, each column has a column heading indicating the monitor displayed for that monitor. Thus, each column has an entry, the heading, containing text data. Similarly, each row may have a row heading indicating the system within the network from which the monitors are received.

The heading for each column describing the monitor is typically significantly longer than the data in another entry for the monitor. Because of the large number of monitors that may have been queried and the width of the column heading, a conventional table may extend beyond the display of the network administrator's system. In order to view entries for some of the monitors, the network administrator scrolls horizontally to bring data relating to additional monitors into view. Many users do not wish to perform horizontal scrolling or do not realize that horizontal scrolling is available. In addition, because of the difference in length between some column headings and the other entries in these columns, there is a great deal of wasted space on the display. Thus, it is difficult for a network administrator to work with the information displayed in the table.

In order to allow the user to avoid horizontal scrolling and to more efficiently display information, some conventional applications truncate the column width or allow a user to edit column headings or other entries containing text data. For example, in a table displaying monitors, the column heading "CPU Utilization" might be truncated to be "CPU Ut". However, information important in identifying the monitor may be lost by truncating the column heading.

Another conventional method for shortening column headings is to allow the user to edit individual column headings or other entries containing text data. However, editing the column headings may be time consuming. For example, if there is a large number of monitors which the network administrator wants to view, the network administrator may need to edit the heading for each column. If there is a large number of other entries containing text data, the task of editing the column entries becomes even more time consuming. In addition, each time the network administrator generates a new table to receive an update on the monitors, the network administrator must edit these column headings. This consumes the network administrator's time.

If the number of column headings is very limited, a conventional application might store a shortened heading for each column to allow the table to occupy less horizontal space. However, storing shortened headings for each column may be problematic where there are a large number of columns or where new columns may be provided. For example, a network administrator may wish to view data regarding a large number of monitors. In addition, the language in which the monitors are to be displayed may change. Moreover, the network administrator may want to view data for a new monitor not previously supplied. The network administrator may then write an application to provide information for a new monitor. Different applications could also be used to query the monitors for the systems in the network. These applications could place the monitors in a different order or provide data for different monitors. If the column contains other entries having text data, it becomes even more difficult to store shortened headings in advance. Consequently, it may be difficult to determine in advance the shortened headings which should be stored and to which column the shortened heading corresponds.

Accordingly, what is needed is a system and method for reducing the horizontal space required by a column heading. The present invention addresses such a need.

SUMMARY OF THE INVENTION

The present invention provides a method and system for reducing an amount of horizontal space required when displaying a plurality of columns on a display screen. At least one column of the plurality of columns has at least one entry containing text data. The method and system comprise obtaining the at least one entry from the at least one column, abbreviating a width of the at least one entry, and determining if there is another entry containing text data. The method and system further comprise repeating the steps of obtaining the at least one entry, abbreviating the at least one entry and determining if there is another entry until all of the at least one entries are abbreviated. The method and system further comprise displaying the at least one column having the at least one abbreviated entry.

According to the system and method disclosed herein, the present invention can display information in a format more easily viewed by a user.

DETAILED DESCRIPTION OF THE INVENTION

The present invention relates to an improvement in displaying data in tables which use horizontal space more efficiently. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
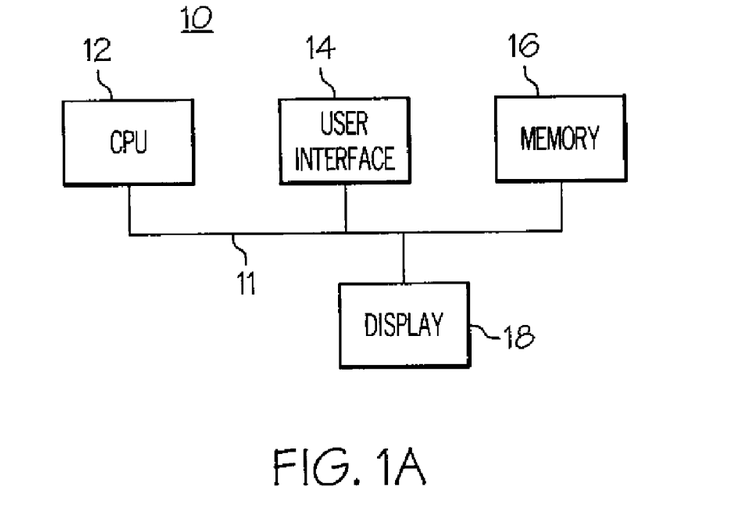
FIG. 1A is a block diagram of a computer system.

FIG. 1A is a block diagram of a computer system 10 in which the present invention can be used. The computer system 10 includes a central processing unit ("CPU") 12 coupled to a system bus 11. Also coupled to the system bus 11 are a user interface 14, a memory 16, and a display 18. Through the user interface 14, the user can input information to the computer system 10. The display 18 allows the user to view information, for example in table form.

Figure 1B:
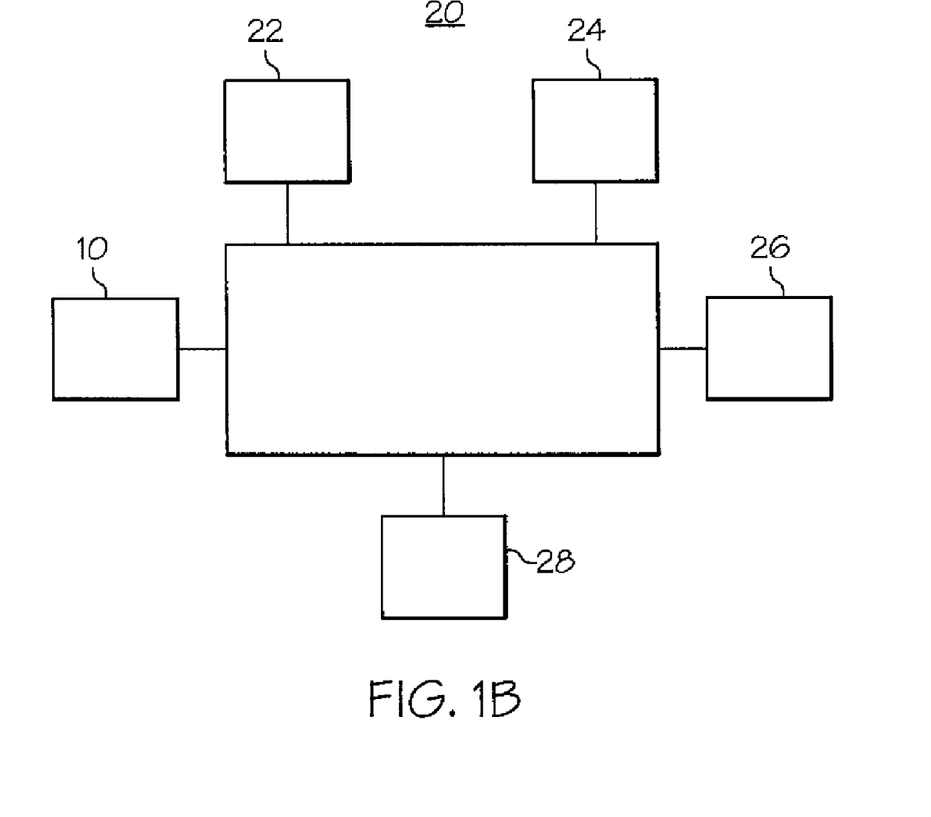
FIG. 1B is a block diagram of a network in which the computer system may reside.

FIG. 1B depicts a network 20 in which the computer system 10 might reside. The network 20 also includes systems 10, 22, 24, 26, and 28. The systems 22, 24, 26, and 28 could include other computer systems, servers, printers, or other apparatus. Although depicted as including five systems 10, 22, 24, 26, and 28, the network 20 could include any number of systems, from one system to thousands of systems, or more.

Referring to FIGS. 1A and 1B, a user of the system 10 may wish to view data on the display 18. To allow a user to easily understand data relating to a variety of objects, data is often shown on the display 18 in a table. The data displayed in the table could relate to a variety of subjects. Data in the table is typically arranged in rows and columns. Each column has entries which could include text data. Text data in entries of a column could require a great deal of horizontal space.

For example, tables with columns having entries containing text data are used in capacity management. Capacity management is of increasing interest for a network containing a plurality of systems, such as the network 20. Capacity management allows a network administrator using the system 10 to monitor the network 20 and ensure that the network 20 functions properly. In order to ensure that the network 20 functions, the network administrator keeps track of monitors for each system 10, 22, 24, 26, and 28. A monitor is an attribute of a particular system 10, 22, 24, 26, or 28. For example, monitors include CPU utilization, disk space available, the number of bytes sent by the system, and the number of bytes received by the system.

Applications, not shown, allow a user to query each system 10, 22, 24, 26, or 28 and receive information relating to each system's monitors. Once the data relating to the monitors are received, a network administrator typically desires to view the data on the display 18. One way of displaying this data is in the form of a table.

Figure 2:
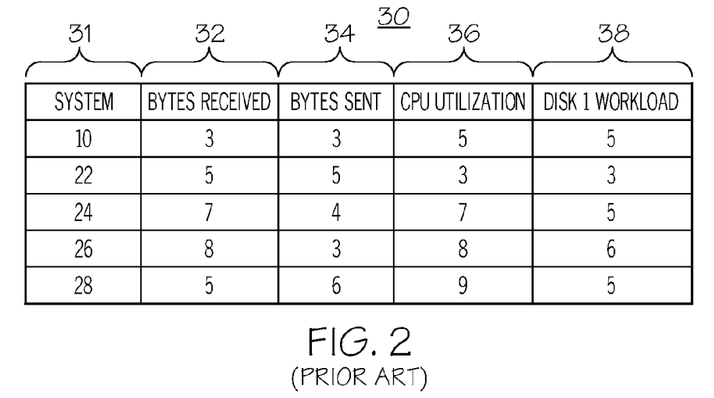
FIG. 2 is a block diagram depicting a table containing information relating to a variety of monitors.

FIG. 2 depicts a table 30 displaying monitors for the systems 22, 24, 26, and 28. The table 30 includes columns 31, 32, 34, 36, and 38. The first column 31 indicates the system 22, 24, 26, or 28 for which the remaining columns 32, 34, 36, and 38 contain monitors. The columns 32, 34, 36, and 38 include entries for a monitor for each system. A row of the table 30 has data relating to monitors for one system 10, 22, 24, 26, and 28 within the network 20. Each column 31, 32, 34, 36, and 38 has a column heading indicating the monitor displayed for that monitor. Thus, each column has an entry, the column heading, containing text data. The column 31 has a heading "System." The heading for the column 32 is "Bytes Received." The column 34 has a heading "Bytes Sent." The heading for the column 36 is "CPU Utilization." The heading for the column 38 is "Disk 1 Work Load." Other columns, not shown, may have other column headings.

As depicted in FIG. 2, the text data in the headings for columns 31, 32, 34, 36, and 38 occupies a significant amount of horizontal space. In the table 30 shown, the column heading describing columns 31, 32, 34, 36, and 38 is often significantly longer than the data in an entry for the column 31, 32, 34, 36, and 38. Because of the large number of monitors that may have been queried and the length of the heading for each column 31, 32, 34, 36, and 38, the table 30 may extend beyond the display 18. In order to view columns, not shown, for some of the monitors, the network administrator scrolls horizontally to bring data relating to additional monitors into view. Many users do not wish to perform horizontal scrolling or do not realize that horizontal scrolling is available. In addition, because of the difference in Length between some column headings and the entries in these columns 31, 32, 34, 36, and 38, there is a great deal of wasted space on the display 18.

Figure 3:
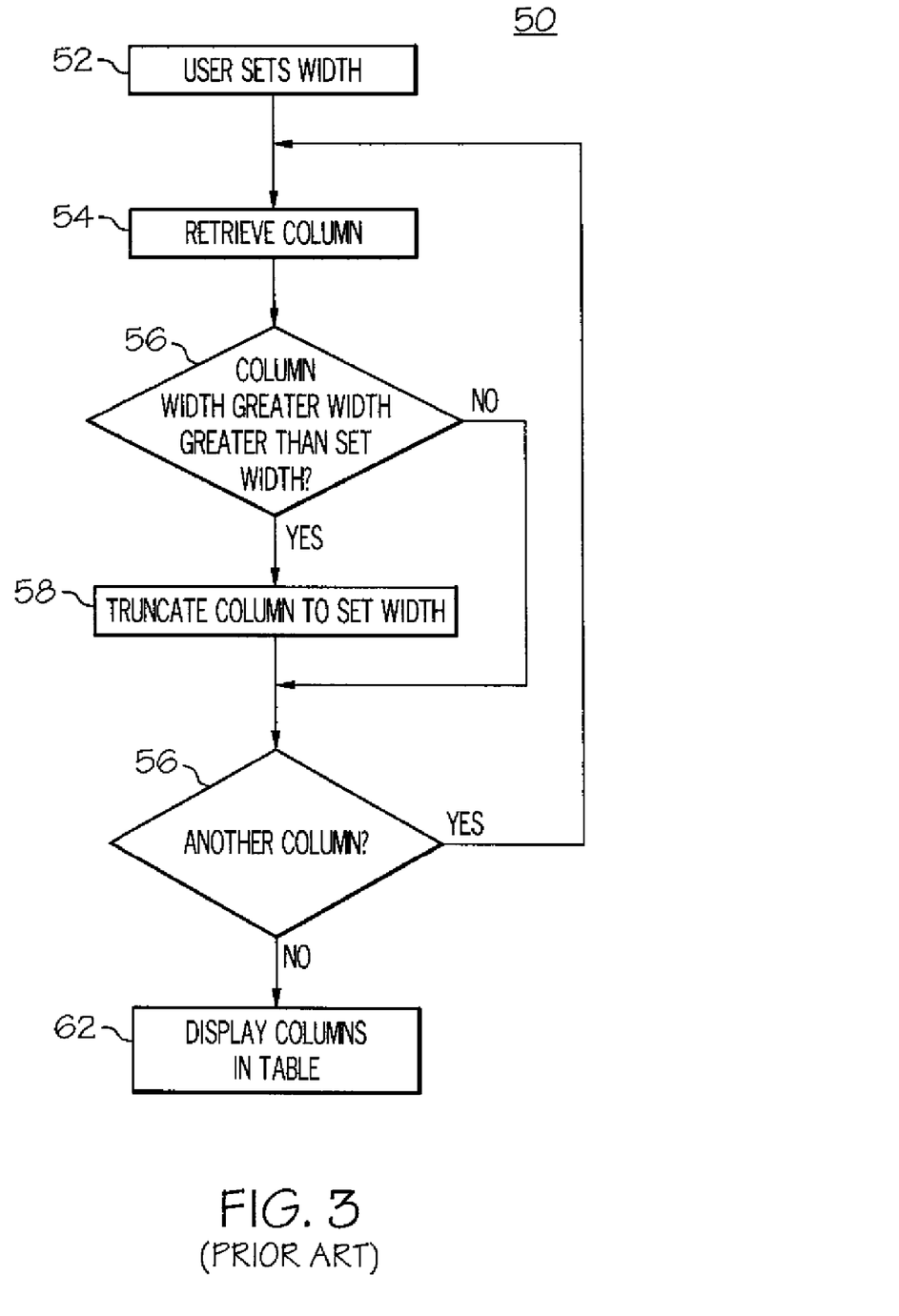
FIG. 3 is a flow chart depicting one conventional method for truncating a column heading.

In order to reduce the horizontal space occupied by text data in an entry, such as a column heading, some conventional methods truncate the width of the column. For example, to allow the user to avoid horizontal scrolling and more efficiently display information, some conventional applications truncate headings for a column 31, 32, 34, 36, and 38. FIG. 3 depicts a conventional method 50 for truncating column headings.

The user enters the desired width of the column heading via step 52. A column is then retrieved via step 54. It is then determined via step 56 if the column is wider than the width set by the user. If the column is wider, then the column is truncated via step 58. If the column is not wider, then the step 58 is omitted. It is then determined if there are any columns remaining. If there are columns remaining, then step 54 through 60 are repeated for the next column. If no columns remain, then the table is displayed via step 62. The method then terminates via step 64.

Figure 4:
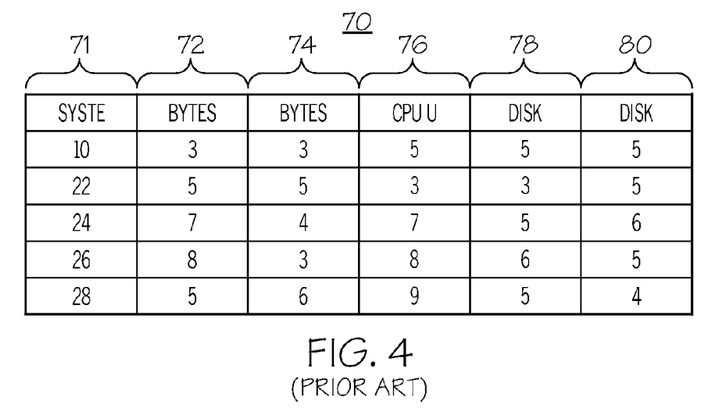
FIG. 4 is a block diagram of a table after column headings have been truncated.

FIG. 4 depicts a table 70 displayed after the conventional method 50 has been used to truncate the columns to be five characters in width. The table 70 contains the same information as the table 30. Thus, the column 71 has a column heading for the "Syste" for the system. The column 72 has a heading "Bytes" for the bytes received. The column 74 has a information relating to the bytes sent and has a heading "Bytes." The heading for the column 76 is "CPU U" and contains data relating to CPU utilization. The column heading for the column 78 is "Disk" and contains information relating to the "Disk 1" work load. The heading for the column 80 is "Disk" for the "Disk 2" work load. Other columns, not shown, may have other column headings. Because each column 71, 72, 74, 76, 78, and 80 has been truncated, column 80 can be displayed to the system administrator without horizontal scrolling.

Although the table 70 has narrower columns 71, 72, 74, 76, 78, and 80, one of ordinary skill in the art will readily realize that important information in the headings for the columns 71, 72, 74, 76, 78, and 80 has been lost. Referring to FIGS. 2 and 4 the second column in both tables 30 and 70 relates to bytes received. The third column both tables 30 and 70 relates to bytes sent. However as shown in FIG. 4, because the headings for columns 72 and 74 has been truncated, it cannot be determined from the headings for columns 72 and 74 which column 72 or 74 contains bytes received and which column 72 or 74 contains bytes sent. Similarly, although columns 78 and 80 both cannot be determined from the headings for columns 78 and 80 which column contains information relating to "Disk 1", and which contains information relating to "Disk 2". Consequently, truncating the headings for columns 71, 72, 74, 76, 78, and 80 in the table 70 does not adequately display information to the user or system administrator.

Referring back to FIGS. 1A, 1B, and 2, another conventional method for shortening headings for columns is to allow the user to edit individual column headings for the columns 31, 32, 34, 36, and 38. However, one of ordinary skill in the art will readily realize that editing the column headings may be time consuming. For example, if there are a large number of monitors which the network administrator wants to view, the network administrator may need to edit the column heading for each column 31, 32, 34, 36, and 38. In addition, each time the network administrator generates a new table 30 to receive an update on the monitors for the systems 10, 22, 24, 26, and 28 in the network 20, the network administrator must edit these column headings. This consumes the network administrator's time. Moreover, for a table, not shown, having columns with multiple entries containing text data, a user may need to edit each entry containing text data. Where there are a large number of entries, editing each entry is even more time consuming. Thus, allowing a user to edit the column headings does not adequately address how information is displayed in the table 30.

If the number of column headings is very limited, a conventional application might store a shortened heading for each column 31, 32, 34, 36, and 38 to allow the table 30 to occupy less horizontal space. However, one of ordinary skill in the art will readily realize that storing a shortened heading for each column 31, 32, 34, 36, and 38 may be problematic where there are a large number of columns 31, 32, 34, 36, and 38 or where new columns 31, 32, 34, 36, and 38 may be provided. Providing shortened text data is also problematic where each column 31, 32, 34, 36, and 38 has many entries with text data.

For example, a network administrator may wish to view data regarding a large number of monitors in the table 30. In addition, the language in which the monitors are to be displayed may change. Moreover, the network administrator may want to view data for a new monitor not previously supplied. The network administrator may then write an application to provide information for a new monitor. Different applications, not shown, could also be used to query the monitors for the systems 10, 22, 24, 26, and 28 in the network 20. These applications could place the monitors in a different order, query different monitors, or even provide the information in a different language. Consequently, it may be difficult to determine in advance the shortened headings which should be stored and to which column 31, 32, 34, 36, or 38 the shortened heading corresponds.

The present invention provides a method and system for reducing an amount of horizontal space required when displaying a plurality of columns on a display screen. The at least one column of the plurality of columns has at least one entry containing text data. The method and system include obtaining the at least one entry from the at least one column, and abbreviating a width of the at least one entry, determining if there is another entry containing text data. The method and system further include repeating the steps of obtaining the at least one entry, abbreviating the at least one entry and determining if there is another entry until all of the at least one entries are abbreviated. The method and system further include displaying the at least one column having the at least one abbreviated entry.

The present invention will be described in terms of abbreviating column headings. However, the present invention can be used to abbreviate another entry having text data. The present invention will be described in terms of a table used to display monitors relating to systems in a network. However, one of ordinary skill in the art will readily recognize that this method and system will operate effectively for other tables storing other types of information. The method and system will also be described in terms of particular sources for data to be displayed in a table, using the English language to display data, and performing the method for a plurality of columns in a table. However, one of ordinary skill in the art will readily realize that the method and system could be used with other sources for data, with tables displaying information in other languages, and for a single column or a number of columns less than the total number of columns in a particular table.

Figure 5:
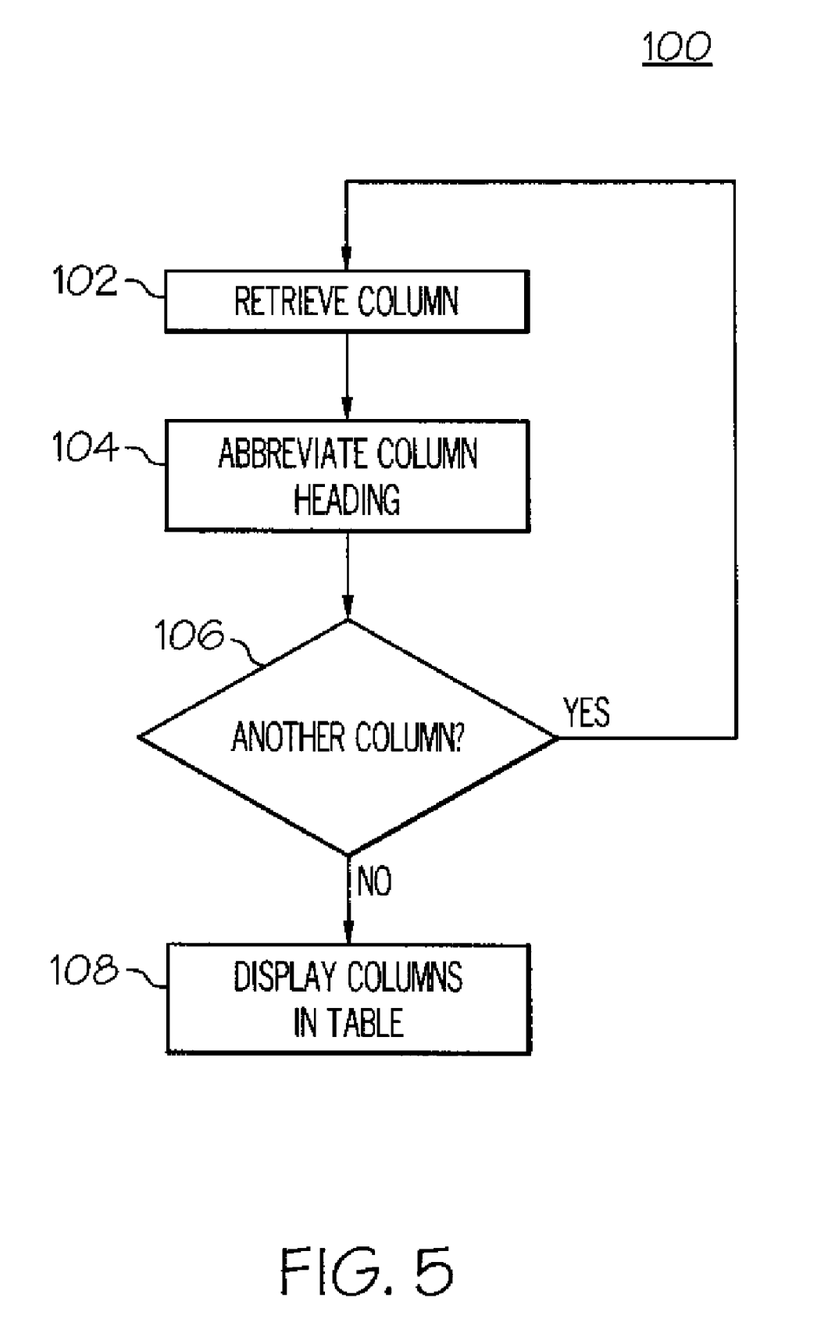
FIG. 5 is a high level flow chart depicting one method in accordance with the present invention for reducing the horizontal space required by a column heading.

To more particularly illustrate the method and system in accordance with the present invention, refer now to FIG. 5 depicting a flow chart of one embodiment of a method 100 for reducing the horizontal space used to display data in a table. The method 100 could be used with the system 10 and the network 20. Thus, the method 100 is useful when displaying monitors for each system 10, 22, 24, 26, and 28 in the network 20.

A column is first retrieved via step 102. Preferably, retrieving a column refers to obtaining the column heading and, perhaps, other information used in the method 100. The column heading is abbreviating via step 104. In an embodiment abbreviating another entry having text data, the other entry having text data is abbreviated in step 104. It is then determined if another column which has not had its column heading abbreviated is available via step 106. In an embodiment in which another entry having text data is abbreviated, it is determined if another column which has an entry containing text data that has not been abbreviated is available in step 106. If so, then step 102 is returned to for the next column. If no unabbreviated columns remain, then the table is displayed via step 108. Note that although the method 100 depicts the step of displaying the columns as occurring after abbreviations are completed for all columns, nothing prevents a column from being displayed earlier.

Abbreviating the column heading rather than truncating the column heading allows certain information to be preserved. In addition, the actual algorithm for abbreviating the column heading can vary. For example, the abbreviation step 104 could include eliminating lower case vowels, eliminating spaces, eliminating certain other characters, or any combination thereof. Moreover, because the user need not enter the abbreviations by hand, reducing the horizontal space required using the method 100 is not time consuming. In addition, the method 100 can adapt to new monitors or columns, new sources of data, new languages, and other changes.

Figure 6:
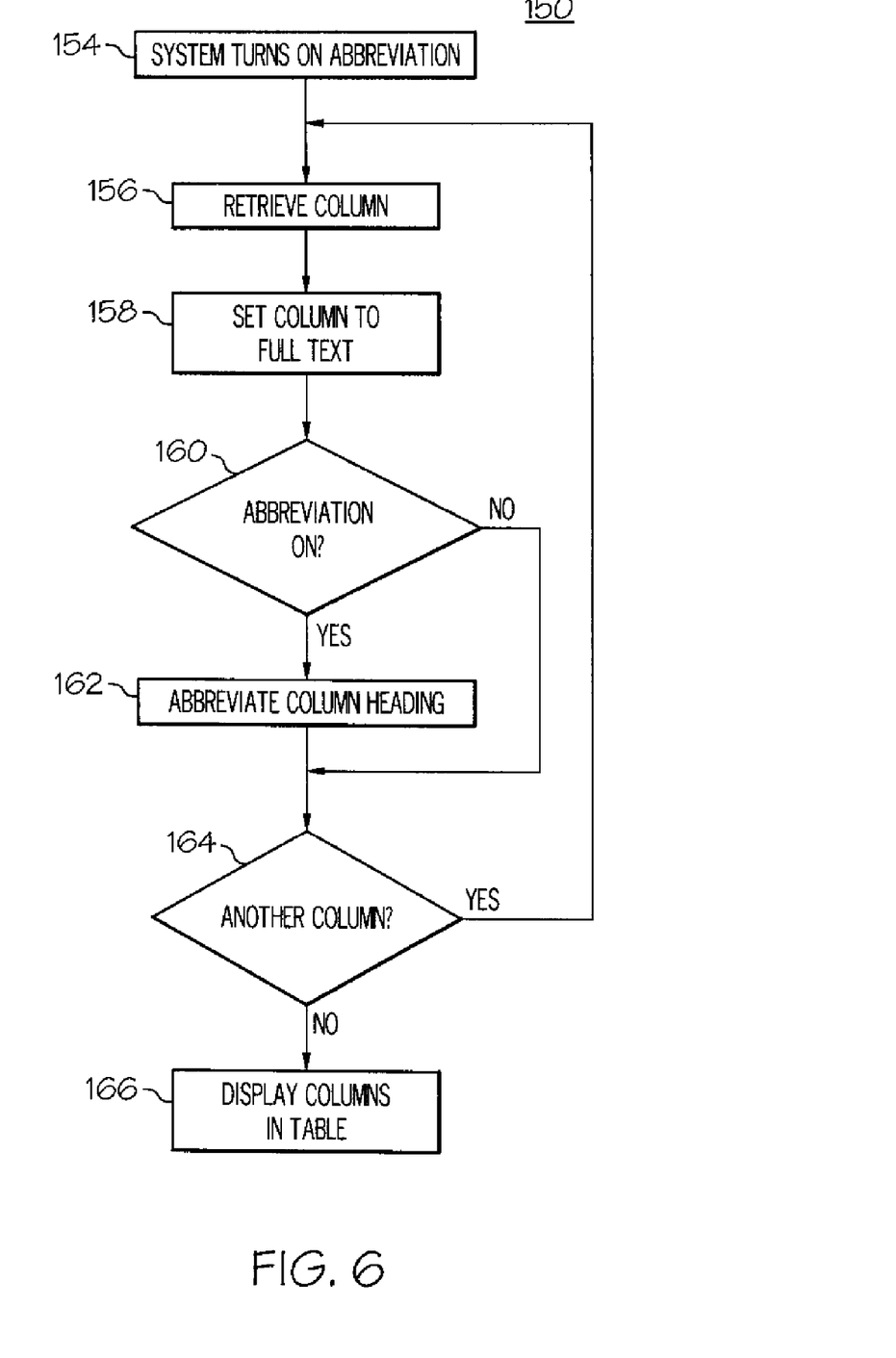
FIG. 6 is a more detailed flow chart depicting one method in accordance with the present invention for reducing the horizontal space required by a column heading.

FIG. 6 depicts a more detailed flow chart of a method 150 for abbreviating column headings in accordance with the present invention. The method 150 has the advantages of the method 100. In one embodiment, the method 150 can be used for abbreviated another entry containing text data in a column. In such an embodiment, steps discussed as being performed on a column heading are performed on the entry containing text data.

The system 10 turns on the abbreviation via step 154. In one embodiment, the system 10 turns on the abbreviation in response to the user turning on or off the abbreviation or setting the column heading width. A column is then retrieved via step 156. Thus, the first column is initially retrieved. Step 156 is analogous to step 102 in the method 100. The column heading may then be set to its full text description, via step 158. It is then determined whether the abbreviation is on via step 160. If the user has turned abbreviation on, then the column heading is abbreviated via step 162. Thus, step 162 is analogous to the step 104 of the method 100. If abbreviation has not been activated, then the step 162 is skipped. It is then determined if another, unabbreviated column is available, via step 164. if there is another column available, then the method 150 returns to step 156 in order to retrieve the next column. Thus, steps 156 through step 164 are repeated. If there are no other columns available, then the columns are displayed via step 166. Note that although the method 150 depicts the step of displaying the columns as occurring after abbreviations are completed for all columns, nothing prevents a column from being displayed earlier.

Figure 7:
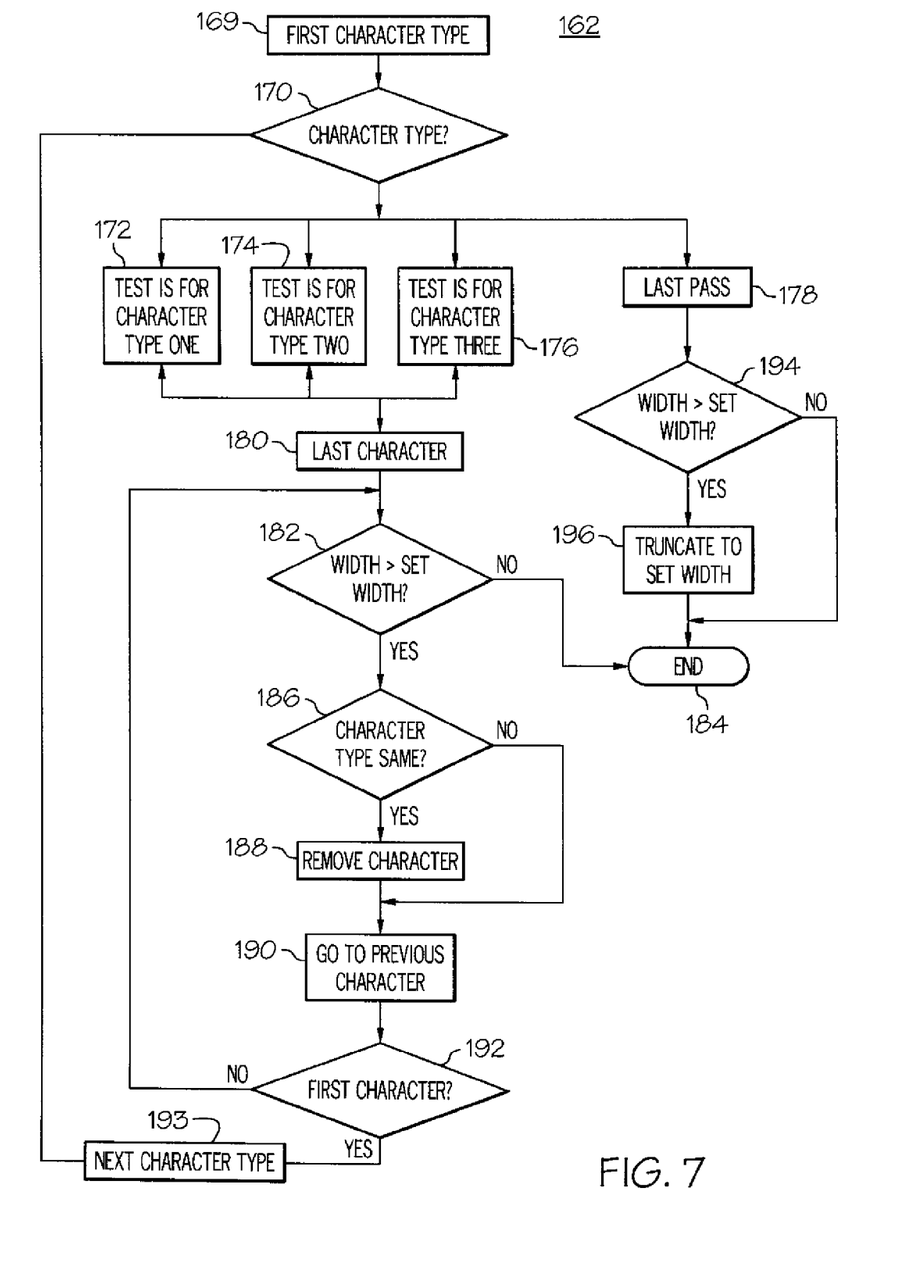
FIG. 7 is a detailed flow chart depicting one method in accordance with the present invention for abbreviating a column heading.

FIG. 7 depicts another more detailed flow chart of one method for performing the abbreviation step 162 of the method 150 or the step 104 of the method 100. The first character type is retrieved via step 169. It is then determined which character type will undergo abbreviation for a particular pass through a column heading via step 170. Thus, step 170 determines a current character type. In a preferred embodiment, there are three character types: lower case vowels (type two), lower case letters (type three), and spaces (type one). In another embodiment, other character types can be chosen. For example, letters other than vowels could be chosen as type two, the second character type. In addition, the character types could be in another order. For example, in an alternate embodiment, the type one character could be designated as lower case letters, etc.

Via steps 172, 174, 176, and 178 the test for the character type is set. If the character type was determined to be type one in step 170, then the system 100 will informed that the column heading should be tested for spaces in step 172. If the character type was determined to be type two in step 170, then the system 100 will informed that the column heading should be tested for lower case vowels in step 174. If the character type was determined to be type three in step 170, then the system 100 will informed that the column heading should be tested for lower case characters in step 176. If the character type is not type one, type two or type three, then step 178 is used. Thus, in a first pass through the column heading, the character type will be type one. In a second pass through the column heading, the character type will be type two. In a third pass through the column heading, the character type will be type three. In the fourth pass, step 178 will be used. Even though the preferred embodiment uses four passes other number of passes could be used without deviating from the teachings of the present invention.

The last character for the column heading is retrieved via step 180. It is then determined if the width of the column heading is greater than the width set in step 52 of the method 50, via step 182. If the width is not greater than the width set, the abbreviation is terminated via step 184. Thus, the abbreviation method 162 can be terminated when the column heading reaches the set width regardless of the number of passes made for the heading.

If the width is greater than the set width, then via step 186 it is determined if the character is the same type as set in steps 172, 174, or 176. Thus, in a preferred embodiment, for a first pass through the column heading, it is determined if the character is a space via step 186. For a second pass through the heading determined using step 174, then in a preferred embodiment it is determined if the character is a lower case vowel via step 186. If it is the third pass through the heading, then in a preferred embodiment, it is determined if the character is a lower case character via step 186. As a result, step 186 determines if the character matches the character type for the appropriate pass via set step 186.

If the character matches the current character type in step 186, then the character is removed in step 188. If, however, the test in step 186 determines that the character does not match the current character type, then step 188 is skipped. The previous character is then retrieved via step 190. Via step 192 it is determined if the character retrieved in step 190 is the first character. If the character is not the first character, then step 182 through step 192 are repeated. Thus, each character in the column heading is tested to see if it matches the current character type and removed if a match is found. If in step 192 it is determined that the first character was retrieved, then in step 193 the next character type is retrieved. Step 170 is then returned to in order to determine the next character type for the next pass through the column heading. If the first three character types in step 172, 174, and 176 have been exhausted, then step 178 is used.

Step 178 sets the test as being a truncation test. Thus, in the last pass through the column heading, the column heading may be truncated. It is determined via step 194 if the width of the column heading is still greater than set in step 152. If the width is greater, then the column heading is truncated to the appropriate number of characters via step 196. If the width is not greater, then step 196 is omitted. The abbreviation method 162 is then terminated via step 184.

Figure 8:
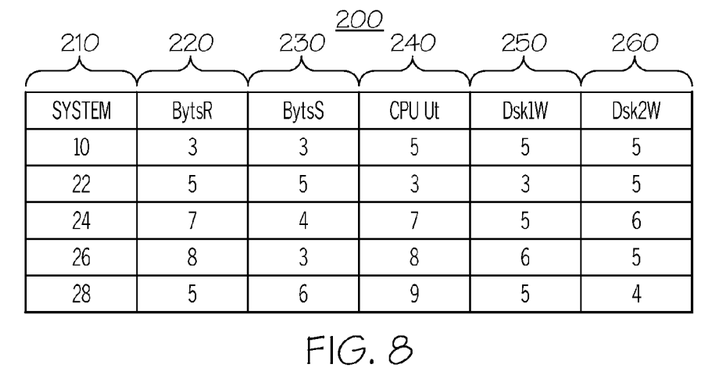
FIG. 8 is a block diagram of a table after column headings have been abbreviated using a method in accordance with the present invention.

FIG. 8 depicts a table 200 after abbreviation has been completed via the methods 100 or 150. The table 200 contains columns 210, 220, 230, 240, 250, and 260. The table 200 contains the same information as in the tables 30 and 70 of FIGS. 2 and 4, respectively. Referring back to FIG. 8, the column headings have been abbreviated as discussed with respect to the step 162. Thus, spaces, lower case vowels and lower case letters have been removed to limit the heading of each column 210, 220, 230, 240, 250, and 260 to five characters.

The horizontal space used by the table 220 has been reduced without losing vital information. For example, in contrast to the table 70 of FIG. 4, the columns 220 and clear that the column 250 refers to the first ("Dsk1W"), while the column 260 refers to the second disk's work load ("Dsk2W"). Thus a user can still distinguish between information contained in different columns of the table 200.

In addition, the user did not have to enter the abbreviation by hand. Instead, the user merely switched the abbreviation on via step 162. Thus, the user's time is not needlessly consumed. In addition, the method 100 or 150 can be adapted to different languages, different monitors, or different source for data. The method abbreviates existing columns, rather than storing shortened headings for particular columns. As a result, the abbreviation methods 100 and 150 need not know in advance which column contains what data or in what order the columns are arranged. In addition, the method 100 and 150 can be used for data other than capacity management. Moreover, by changing the abbreviation tests in 172, 174, 176, or 178, the user can adapt the method 100 or 150 to different languages.

A method and system has been disclosed for reducing the amount of horizontal space required when displaying text data in a table. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method implemented on a computer for abbreviating a word comprising:
    a) defining spaces, lower case vowels, and lower case letters as character types to be deleted from the word;
    b) assigning a character type value of one for spaces, a character type value of two for lower case vowels, and a character type value of three for lower case letters;
    c) providing the word;
    d) examining the word in sequential order first for characters associated with character type one, second for character associated with character type two, and third for characters associated with character type three;
    e) deleting from said word all character types associated with character type values so assigned wherein deletion is executed in the sequential order in which the word is examined; and
    f) displaying on a monitor the remaining portion of said word.

2. The method of claim 1 wherein e) includes deleting each one of said character type sequentially in the same order in which said character type values has been assigned.

3. The method of claim 2 further including setting a predefined width for said word; and
    testing a portion of the word remaining subsequent to deleting each one of said character type associated with each one of said character type values to determine a width of said portion.

4. The method of claim 3 wherein f) is executed only if the portion of the word remaining is less than or equal to the predefined width.

5. The method of claim 1 wherein the word includes at least a column heading in a table.

6. A method implemented on a computer for abbreviating a word comprising;
    a) defining three character types wherein a first one of the three character types represents spaces, a second one of the three character types represents lower case vowels, and a third one of the three character types represents lower case letters;
    b) defining a numeric value for each one of said three character types;
    c) defining a sequence, based upon each of the numeric values, in which the word is to be examined;
    d) examining the word sequentially in accordance with the defined sequence;
    e) deleting character types, associated with the numeric values in the same order in which said numeric values are placed in the sequence, if detected in said word; and
    f) displaying on a monitor a part of the word remaining subsequent to execution of e).

7. The method of claim 6 wherein the numeric values include one for spaces, two for lower case vowels, and three for lower case letters.

8. The method of claim 7 wherein the sequence is arranged in ascending order beginning with lowest numeric value to highest numeric value of the sequence.

* * * * *